United States Patent [19]
Halpern

[11] 3,906,460
[45] Sept. 16, 1975

[54] PROXIMITY DATA TRANSFER SYSTEM WITH TAMPER PROOF PORTABLE DATA TOKEN

[76] Inventor: John W. Halpern, 980 Ignacio Blvd., Apt. 11, Novato, Calif. 94947

[22] Filed: Jan. 11, 1973

[21] Appl. No.: 322,669

[52] U.S. Cl. ........ 340/172.5; 178/22; 235/61.11 H; 235/61.12 N; 235/61.7 B; 235/61.8 A; 340/149 A
[51] Int. Cl. ..... G07f 7/02; G06k 1/14; G06k 19/00
[58] Field of Search ........ 340/172.5, 149 A, 149 R, 340/164 R; 283/8; 235/61.7 R, 61.7 B, 61.8 A, 235/61.11 H, 61.11 J, 61.12 N; 178/22

[56] References Cited
UNITED STATES PATENTS

| | | | |
|---|---|---|---|
| 3,544,769 | 12/1970 | Hedin | 235/61.9 |
| 3,564,210 | 2/1971 | Presti | 235/61.7 |
| 3,587,049 | 6/1971 | Nicklas | 340/149 |
| 3,604,900 | 9/1971 | Kalt | 235/61.12 |
| 3,609,300 | 9/1971 | Halpern | 235/61.7 R |
| 3,637,994 | 1/1972 | Ellingboe | 235/61.12 N |
| 3,641,498 | 2/1972 | Hedin | 340/164 R |
| 3,651,464 | 3/1972 | Hedin | 340/149 R |
| 3,662,343 | 5/1972 | Goldstein | 340/149 |
| 3,702,464 | 11/1972 | Castrucci | 340/172.5 P |
| 3,764,742 | 10/1973 | Abbott | 178/22 |

FOREIGN PATENTS OR APPLICATIONS
851,357 9/1970 Canada.................................. 340/70

Primary Examiner—Gareth D. Shaw
Assistant Examiner—James D. Thomas
Attorney, Agent, or Firm—Townsend and Townsend

[57] ABSTRACT

A data handling system comprising a data transfer portion and a portable data token portion. The data transfer portion includes means for transferring data between the data token and a computer, data checking circuitry, means for transferring a validation character signal to the data token, and a program counter for sequencing the data transfer portion components. The data token portion includes a data register, means for storing and fetching data in the data register in cooperation with the data transfer means in the data transfer portion, a validation circuit for preventing alteration of the contents of the data register unless a correct validation character signal is received by the data token portion, and means for rendering the data token portion permanently inoperative after a number of incorrect validation character signals are received thereby. Visual indicators in the data token portion signify that the data in the token register has fallen below a predetermined threshold value and that the data token has been permanently disabled.

32 Claims, 9 Drawing Figures

Fig_5

Fig_4

Fig_6

PROXIMITY DATA TRANSFER SYSTEM WITH TAMPER PROOF PORTABLE DATA TOKEN

BACKGROUND OF THE INVENTION

1. Field of the Invention

This invention relates to data handling systems of the type employing a data transfer device in cooperation with a portable data token for transferring data between the token and a computer. More specifically, this invention relates to such systems having a provision for fetching data from the portable data token, processing the received data, and storing the processed data in the data token.

2. Description of the Prior Art

Data handling systems are known which employ a data transfer device for transferring data between a computer and a portable data token, such as a credit card, a fare ticket and the like. In copending U.S. Pat. application Ser No. 14,931 filed Feb. 27, 1970 for "Proximity Data Transfer Device" now abandoned in favor of application Ser. No. 322,249 filed Jan. 9, 1973 e.g. a data handling system is disclosed which comprises a data sensing device and a portable data token having a data register for containing variable data. The data sensing device is provided with a number of inductive coils for generating power signals, clock pulse signals, and data output signals, and for coupling data signals from the portable data token to an associated computer. The data token is provided with matching coils for coupling data stored in the token to the transfer device, for coupling clock and data signals to an active data register in the token, and for developing supply voltages from the power signals generated from the transfer device for operating the electrical components housed in the token. In this system, data may be fetched from the data token register, processed in the computer, and the resultant data may be stored in the data token register, all in accordance with a predetermined data processing scheme.

In known systems, the data token contains data relating to the user-bearer, such as an account number, an available credit balance, a remaining transportation fare credit, etc. Whenever the data token is presented in the course of a transaction, this data is fetched from the token to a computer and processed therein, after which the resulting data is stored in the data token. The resulting data is frequently used also as a control, e.g. to indicate that the credit balance is exceeded by the transaction, to flag a bad account, to indicate that the remaining fare credit balance is insufficient, etc.

In any data processing system employing portable data tokens, provision must be made to prevent tampering with the token in order to insure that the variable data contained therein presents an accurate indication of the purported information. Depending on the particular application, successful tampering with the token data can produce various undesirable results all tending to defeat the contemplated data processing scheme. For example, if a token is altered in such a manner that the account number information carried therein is incorrect, the transaction can be debited to the wrong party. Similarly, if the credit balance is changed by tampering, the desired credit limit can be exceeded to the detriment of the creditor. Likewise, if the fare balance data of a transportation fare ticket is increased in an unauthorized manner, the token can be used for prolonged mileage. Attempts have been made to devise a data handling system in which the data token is truly tamper-proof. To data, such attempts have not met with wide success.

SUMMARY OF THE INVENTION

The invention disclosed herein comprises a data handling system employing a portable data token which is extremely compact, inexpensive to manufacture, rugged in construction, capable of storing variable data and immune from tampering. The system comprises two portions: a portable data token portion for containing the variable data, and a data transfer portion for effecting data transfer between the token and an associated computer. In the preferred embodiment, the data transfer portion includes a plurality of inductive coils for generating data output signals from a computer, power signals, clock pulse signals and a validation character signal; and for coupling data signals from the data token to the computer. The data token includes a supply voltage generator, a data register, a validation circuit for preventing alteration of the contents of the data register unless a correct validation character signal is received by the data token, anti-fraud means for rendering the data token inoperative after a number of incorrect validation characters are inserted therein, and a corresponding plurality of inductive coils for coupling data stored in the data register to the transfer device, for coupling clock signals and data signals to the data register, for coupling power signals to the supply voltage generator, and for coupling validation character signals to the validation circuit. The validation circuit includes a token identification character generator, a validation character register, and means for generating an enabling signal when the contents of the validation character register corresponds to the token identification character. The anti-fraud means includes a counter, means for incrementing the counter when an incorrect validation character is stored in the validation character register and means for disabling various data token circuit elements when the counter reaches a predetermined count.

The data token portion is further provided with threshold circuitry and associated indicators for warning the token user when the value of the data stored in the data register falls below one or more predetermined thresholds, such as a pre-established minimum credit balance, and for indicating the fact that the token is permanently disabled.

For a fuller understanding of the nature and advantages of the invention reference should be had to the following detailed description taken in conjunction with the accompanying drawings.

DESCRIPTION OF THE PREFERRED EMBODIMENT

General Organization

Figure 1:
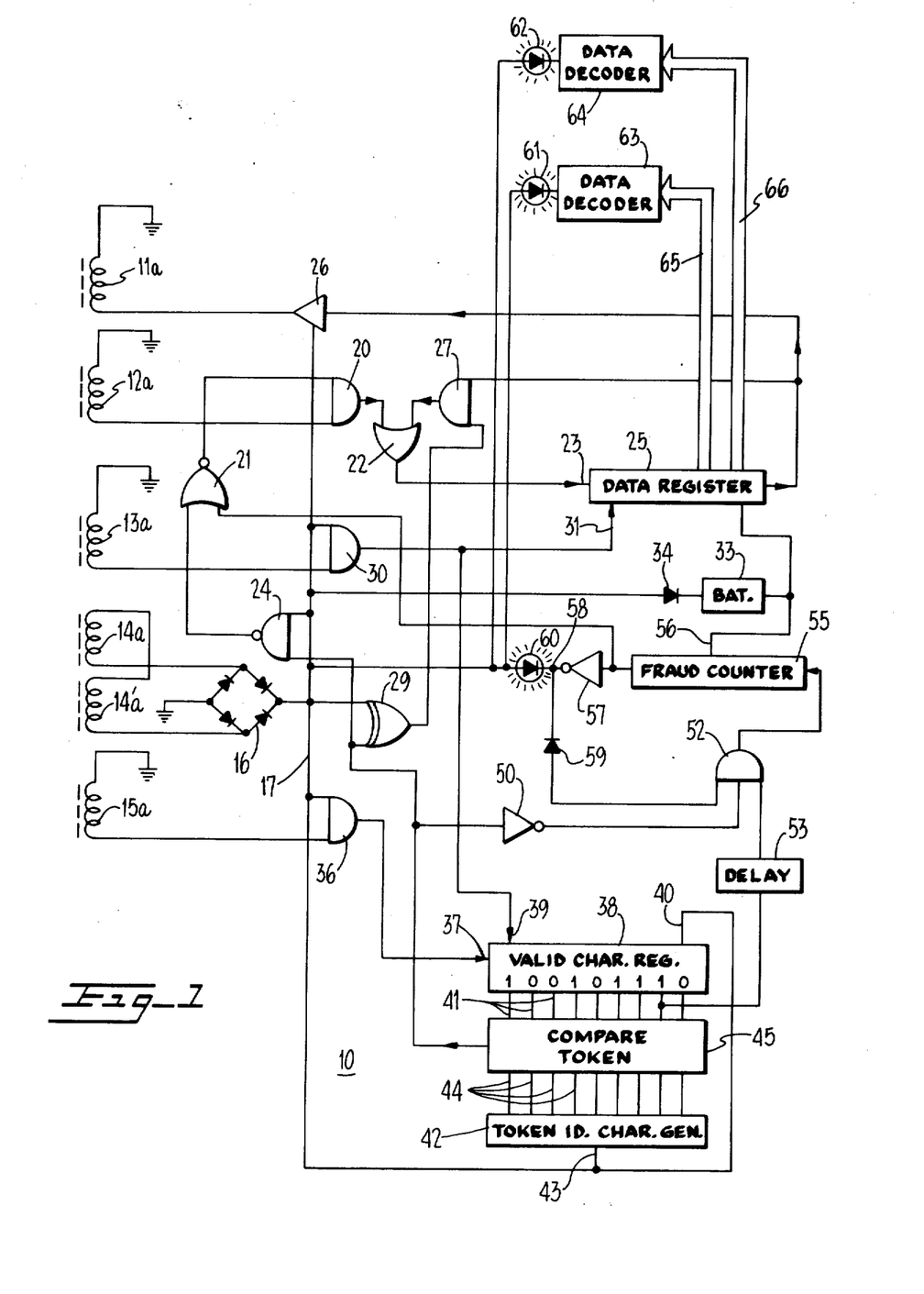
FIG. 1 is a schematic diagram of the portable data token.

Turning now to the drawings, FIG. 1 illustrates the schematic diagram of a portion 10 of the preferred embodiment which is housed in a compact portable data token. Although the data token may take on any one of a number of equivalent forms, such as a card or a coin, in the preferred embodiment the FIG. 1 portion is embodied in a housing having the shape of a small fountain pen, as illustrated in the above cited U.S. Pat. Application.

Figure 2:
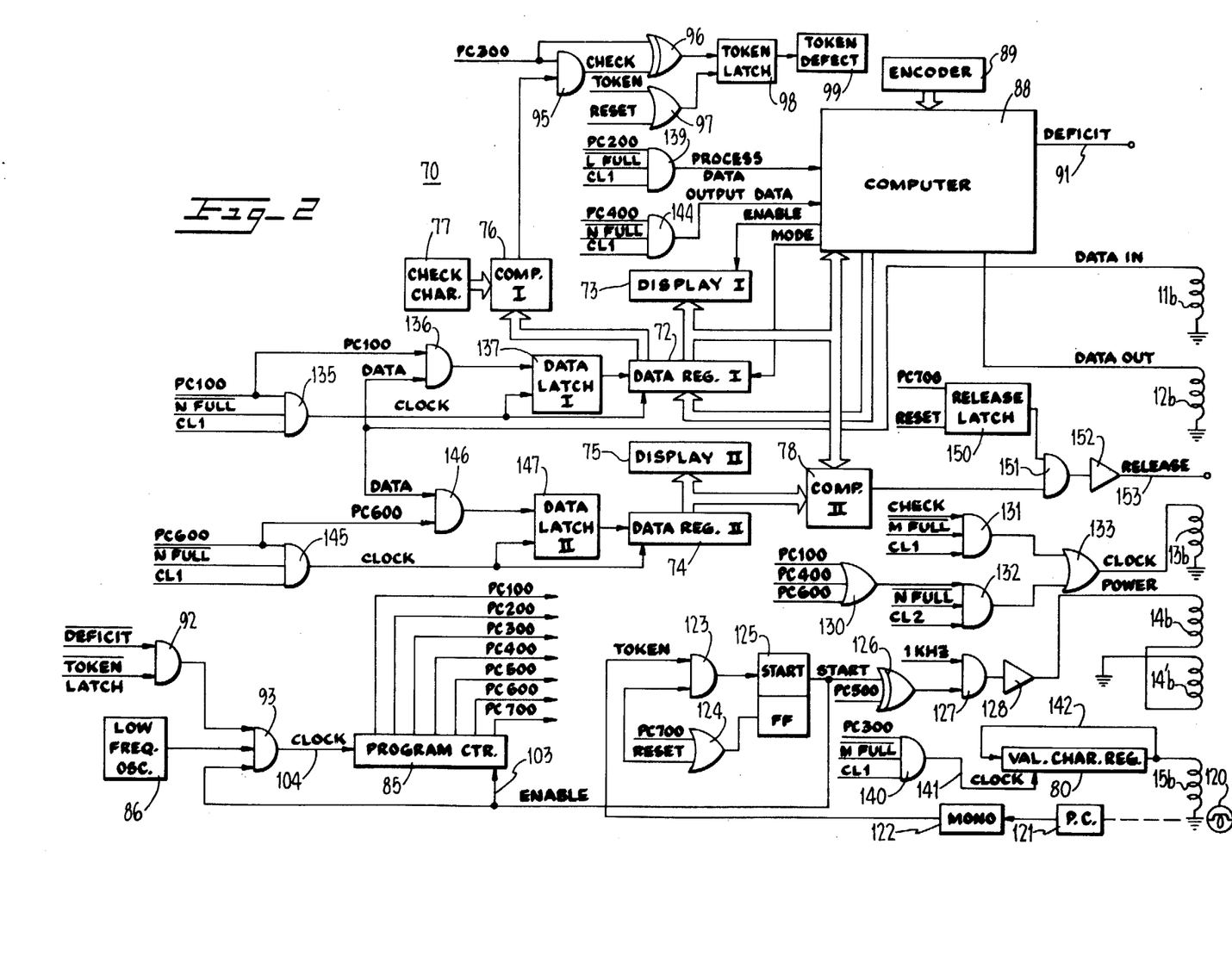
FIG. 2 is a schematic diagram of the data transfer device.

Data token portion 10 is provided with a plurality of sensing coils $11_a$, $12_a$, $13_a$, $14_a$, $14'_a$ and $15_a$ for enabling transfer of various signals between the elements comprising data token portion 10 and a data transfer portion 70 illustrated in FIG. 2. Data token portion 10 further includes a full wave supply voltage rectifying circuit 16 for generating a supply voltage in response to the reception of power signals by a pair of oppositely wound power input coils $14_a$, $14'_a$. Data token portion 10 also includes a data register 25, a rechargeable energy cell 33, a validation character register 38, a token identification character generator 42, a compare token circuit 45, a fraud counter 55, and various logic elements as shown, all for a purpose to be described.

Data transfer portion 70 illustrated in FIG. 2 is provided with a plurality of sensing coils $11_b$, $12_b$, $13_b$, $14_b$, $14'_b$ and $15_b$ matched to the corresponding coils in data token portion 10 for facilitating transfer of various signals between the elements comprising data transfer portion 70 and data token portion 10. In the preferred embodiment the sensing coils are mounted in a token receptacle, illustrated in the above cited U.S. Pat. Application, having a cylindrical bore for receiving the data token, the coils being spaced and arranged so that corresponding coil pairs are inductively linked when the data token is fully inserted. Data transfer portion 70 further includes a pair of data registers 72, 74, a pair of data comparator circuits 76, 78, a validation character register 80, a multi-counter control circuit 82 (shown in FIG. 6) clocked by a high frequency oscillator 83, various logic elements as shown, and a program counter 85 clocked by a low frequency oscillator 86 for controlling the operation of the preferred embodiment in the manner to be described.

General System Operation

Figure 3:
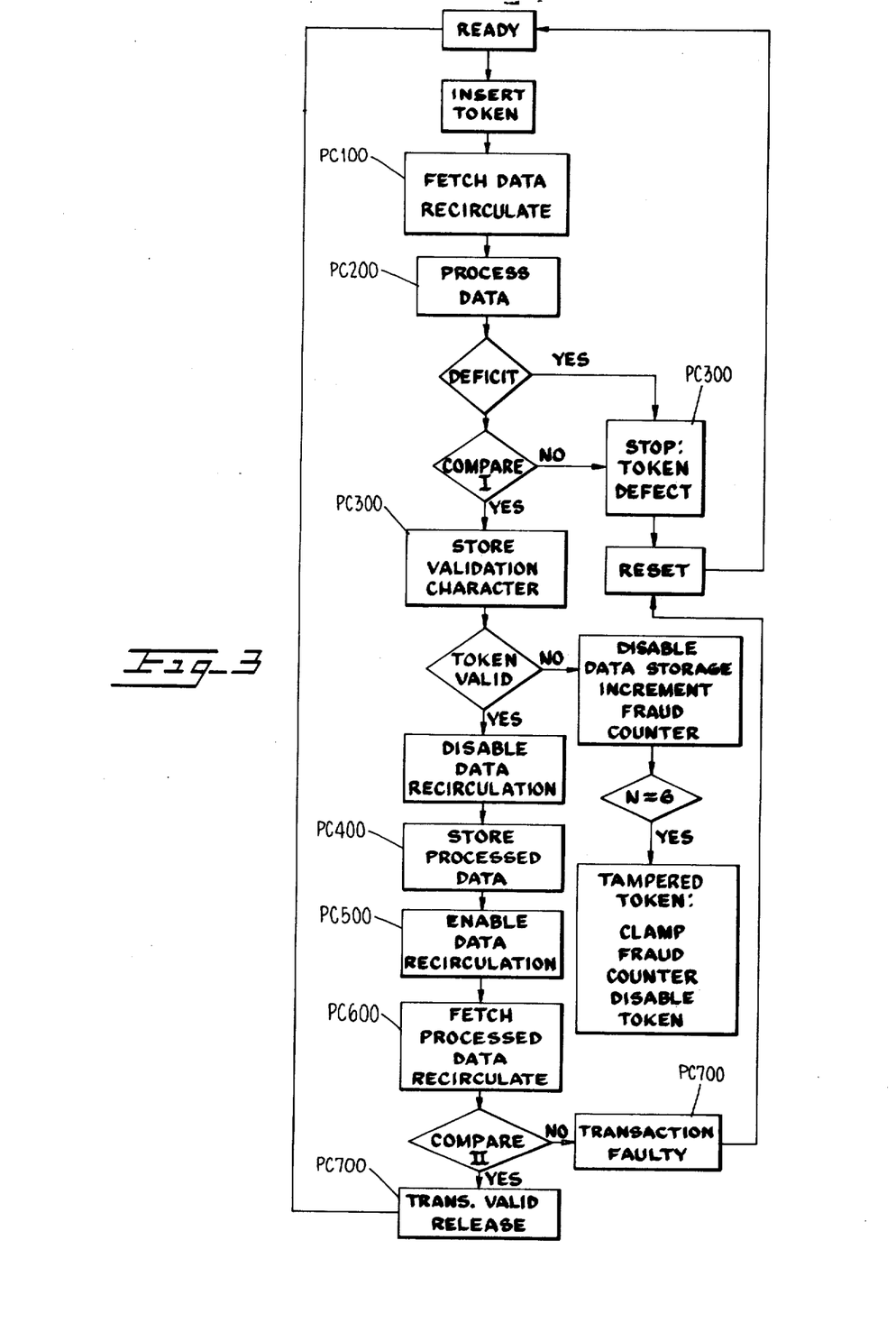
FIG. 3 is a flow chart illustrating the general system operation.

With reference to FIGS. 1-3, the general system operation proceeds as follows. With power applied and data transfer portion 70 in the READY state, insertion of a data token by the user enables program counter 85 to begin a data handling cycle. During step PC100 the data word in data register 25 of token portion 10 is fetched to first data register 72 (hereinafter designated DATA REG I 72) and also recirculated in data register 25. During step PC200 the data in DATA REG I 72 is non-destructively shifted out in parallel to DISPLAY I 73 and to a general purpose computer 88 where it is processed under the control of an encoder 89 according to a predetermined data processing scheme. The actual data processing scheme employed is dependent upon the particular application to which the data token is associated and forms no part of the present invention. If the data token comprises a transportation fare token, computer 88 may be programmed to perform a fare collection and subtraction to obtain a new fare credit sum. If the data token comprises a credit card, computer 88 may be programmed to perform a sales transaction and available credit balance calculation. Since the actual data processing scheme selected forms no part of the present invention, it is accordingly not specified in detail. The processed data is transferred in parallel to DATA REG I 72 and retained in an output register of computer 88.

If the computation performed during step PC200 resulted in a deficient balance so that a DEFICIT signal is present on output lead 91, the inverted counterpart of this control signal disables an AND gate 92 which in turn disables an AND gate 93, thereby blocking transmission of clock pulses from oscillator 86 to program counter 85 as shown and ceasing further operation of the system. If desired the DEFICIT control signal may also be utilized to light a panel display to indicate to the user or an attendant that the token balance is insufficient to support the transaction.

After the data has been processed by computer 88 and is available for transfer to data register 25 of data token portion 10, a check portion of the data originally fetched from data register 25 is compared with a check character in comparator circuit 76, hereinafter designated COMPARE I 76. The check portion of the data character may comprise one or more digits for identifying the type of token (e.g. a credit card, a transportation fare ticket for a particular locale such as a municipal transit system, or the like). The check character is generated by the check character generator 77 which may comprise any suitable device for generating the check character associated with the particular system. An i-bit register where i-equals the number of check character bits may be employed for this purpose. A modified version of the token identification character generator 42, described below, may also be utilized. Other equivalent devices will occur to those skilled in the art. COMPARE I 76 may comprise any suitable device for comparing the characters generated by check character generator 77 and the check portion of the data word in DATA REG I 72, such as a modified version of the compare token circuit 45 illustrated in the FIG. 4.

If the output of COMPARE I 76 indicates that the wrong type of token has been inserted into the receptacle, a token latch 98 is set and the resulting TOKEN LATCH signal applied inverted to AND gate 92 disables this element which in turn disables AND gate 93, thereby blocking the transmission of clock pulses from oscillator 86 to program counter 85 as shown and ceasing further operation of the system.

If the token balance is sufficient and the token type is proper, when the system steps to PC300 an M-bit validation character contained in validation character register 80 of data transfer portion 70 is stored in validation character register 38 of data token portion 10 and compared in COMPARE TOKEN circuit 45 with a token identification character generated internally by token identification character generator 42. In the preferred embodiment, the validation character serves to identify the credit transaction system with which a particular class of tokens may be used. In a transportation fare system, e.g., the validation character may identify the associated transportation authority, such as the San Francisco Bay Area Rapid Transit System. If the token is not of the permissible class, COMPARE TOKEN circuit 45 prevents the processed data from being stored in data register 25. In addition, FRAUD COUNTER 55 is incremented. If the token is of the permissible class, recirculation of the original data in data register 25 is inhibited. During step PC 400 the processed data is transferred from the output register of computer 88 to data register 25, thereby destroying the original data therein. During step PC 500, recirculation of data in data register 25 is enabled. During step PC600, the processed data is recirculated in data register 25 and fetched from data register 25 to DATA REG II 74, displayed in DISPLAY II 75 for visual comparison with the processed data displayed in DISPLAY I 73 and compared in comparator circuit 78, hereinafter designated COMPARE II 78. If the data agrees, signifying that the processed data was correctly transferred to data token portion 10, during step PC700 a RELEASE control signal is generated, which may be used to release a cash register drawer or a turnstile gate, and the system is automatically returned to the READY state. If the data disagrees, the release control signal is not generated. If desired, an indicator display may be actuated to indicate that the transaction is invalid.

The system is provided with an external reset control to restart operation if the system is stopped during step PC300 or the transaction is invalid during step PC700.

As noted above, if the internally generated data token identification character and the validation character disagree during step PC300, data storage in data register 25 is inhibited and FRAUD counter 55 is incremented. If FRAUD counter 55 is incremented a predetermined number of times (6 in the preferred embodiment) by erroneous validation characters, the data token is permanently disabled. Thus, it attempts are made to discover the internal data token identification character by injecting an externally generated validation character and inductively sensing the state of the data storage circuitry of data token portion 10, the token is rendered permanently useless. The importance of this feature is discussed below.

SPECIFIC ORGANIZATION

Data Token Portion 10

As noted above, data token portion 10 has a plurality of inductive coils $11_a$, $12_a$, $13_a$, $14_a$, $14'_a$ and $15_a$ for enabling transfer of various signals between the elements comprising data token portion 10 and data handling portion 70. Power input coils $14_a$, $14_a 14_a$' comprise a pair of oppositely wound coils interconnected as shown and coupled to full wave rectifier circuit 16. The output of rectifier circuit 16 is coupled to a common supply bus 17 and provides enabling voltages for the circuit elements of FIG. 1. The output of rectifying circuit 16 is also coupled to a first input of an exclusive OR gate 39 for a purpose described below.

Data input coil $12_a$ is coupled to one input of an AND gate 20, the other input to which is the output from an inverter OR gate 21. The output of AND gate 20 is coupled via an OR gate 22 to the data input 23 of data register 25. The output of data register 25 is coupled to the input of an amplifier 26, the output of which is coupled to data output coil 11a. The output of data register 25 is also coupled to an input of an AND gate 27, the remaining input to which is the output from exclusive OR gate 29. The output of AND gate 27 is also coupled via OR gate 22 to the data input 23 of data register 25.

Clock input coil $13_a$ is coupled to the input of an AND gate 30 the output of which is coupled to the clock input 31 of data register 25.

In the preferred embodiment, data register 25 comprises a serially arranged N-bit shift register where N is the maximum desired number of bits in a complete data word. A small rechargable energy cell 33 is coupled to the supply voltage input of data register 25 to provide power in a continuous manner to data register 25 for rendering the storage nonvolatile. A recharging diode 34 coupled between supply bus 17 and the charging input of cell 33 provides a charging voltage for replenishing cell 33 when a supply voltage is present on supply bus 17.

When AND gates 20,30 are enabled, data received by data input coil $12_a$ is serially clocked into data register 25 by clock pulses received by clock input coil 13. The contents of data register 25 are also serially clocked out by the clock pulses and coupled through amplifier 26, when enabled in the manner described below, to data output coil $11_a$. In addition, the contents of data register 25 are also serially recirculated via AND gate 27 when this gate is enabled by the output from exclusive OR gate 29. As also noted below, when data input AND gate 20 is enabled, data recirculation AND gate 27 is disabled so that stale data is destroyed when fresh data is presented to data input 23 of data register 25.

Validation character input coil $15_a$ is coupled to an input of an AND gate 36, the output from which is coupled to the data input 37 of validation register 38. The clock input 39 of validataion character register 38 is coupled to the output of AND gate 30, which as noted above transmits clock signals when enabled. The supply input 40 of validation register 38 is coupled to supply bus 17.

Validation character register 38 comprises a serially arranged M-bit shift register, where M is the maximum desired number of bits in a complete validation character. Unlike data register 25, in the preferred embodiment, validation character register 38 is a volatile store which holds a validation character only so long as an enabling voltage is present on supply bus 17. The several stages of the validation character register 38 are coupled to parallel output leads 41 for a purpose described below. In FIG. 1, validation character register 38 is depicted in the active state as containing a correct validation character arbitrarily chosen as 100101110.

A token identification character generator 42 has a supply input 43 coupled to supply bus 17. Character generator 42 comprises a hard-wired device for generating a predetermined M-bit token identification character at the parallel output leads 44 whenever an enabling voltage is present on supply bus 17. Character generator 42 may comprise a plurality of conductive strips coupled between the supply input 43 and the parallel output leads 44 which correspond to "ones" bits of the data token identification character. Other suitable equivalents will occur to those skilled in the art.

Figure 4:
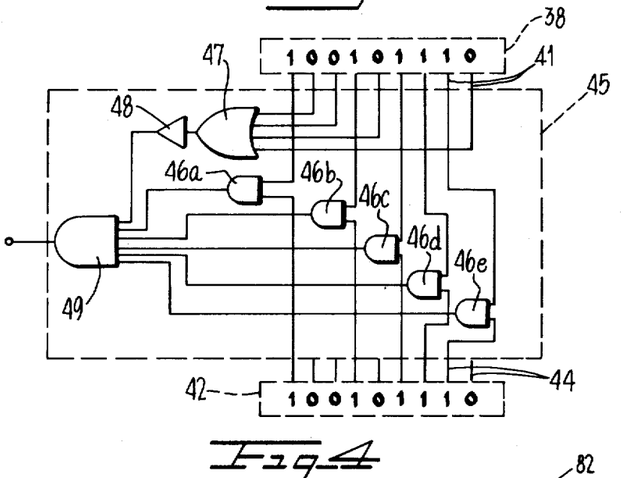
FIG. 4 illustrates a comparator circuit used in the preferred embodiment.

Parallel output leads 41 and 44 are coupled to a COMPARE TOKEN circuit 45, shown in FIG. 4, which provides an enabling control output signal whenever the character in validation character register 38 agrees with the token identification character generated by character generator 42.

With reference to FIG. 4 COMPARE TOKEN circuit 45 comprises a plurality of AND gates 46 $a$–$e$, an OR gate 47, an inverter 48 and an AND gate 49. Those output leads 44 corresponding to the ones bits of the predetermined data token identification character are individually coupled to a first input of different ones of AND gates 46 $a$–$e$. The output leads 41 of the several stages of validation character 38 corresponding to the like ordered ones bits of the same predetermined data token identification character are individually coupled to the remaining inputs of different ones of AND gates 46 $a$–$e$. The output leads 41 of the several stages of validation character register 38 corresponding to the "zeroes" bits of the data token identification character are coupled to the several inputs of OR gate 47. The output of OR gate 47 is coupled through inverter 48 to a first input of AND gate 49. The outputs of each of AND gates 45 $a$–$e$ are coupled to the remaining inputs of AND gate 49. Thus, whenever validation character register 38 and token identification character generator 42 are enabled by supply voltage on bus 17, AND gate 49 produces an enabling output provided that the character contained in validation character register 38 corresponds with the predetermined data token identification character generated by character generator 42. If the contents of validation character register 38 do not agree with the predetermined data token character, AND gate 49 is disabled.

The output of COMPARE TOKEN circuit 45 is coupled to a second input of exclusive OR gate 29, to a second input of an inverting AND gate 24 and through an inverter 50 to a first input of an AND gate 52. The output of inverting AND gate 24 is coupled to one input of inverting OR gate 21. The remaining input of AND gate 52 is obtained from one of the ones bits output leads 41 of validation character register 38 coupled through a delay circuit 53 providing a suitable delay. In the preferred embodiment, delay circuit 53 is couupled to the M-1st output lead 41 and is designed to provide a delay slightly greater than the time required for COMPARE TOKEN circuit 45 to produce an enabling output if the validation character in validation character register 38 corresponds to the data token identification character generated by character generator 42. Delay circuit 53 may be implemented by means of a pair of serially coupled inverting amplifiers or suitable equivalent delay devices.

The output of AND gate 52 is coupled to the toggle input of FRAUD counter 55. FRAUD counter 55 comprises a scale of X counter, where X is an integer chosen arbitrarily in accordance with the principles discussed below. In the preferred embodiment, energy cell 33 is coupled to a supply input 56 of FRAUD counter 55 to render this counter non-volatile. FRAUD counter 55 may be implemented in any suitable manner known to those skilled in the art.

The last stage of FRAUD counter 55 is coupled directly to the remaining input of inverting OR gate 21 and through an inverter 57 to a junction 58. The remaining input to AND gate 52 is also coupled to junction 58 through a diode 59.

The operation of the FIG. 1 portion of the preferred embodiment proceeds as follows. In the absence of power signals to power input coils $14_a$, $14'_a$, data register 25 and FRAUD counter 55 are energized by cell 33 and the remaining elements are disabled. The oppositely-wound configuration of power input coils $14_a$, $14'_a$, prevents spurious noise pulses from causing a supply voltage to be produced by rectifying circuit 16.

Whenever power signals of proper polarity and phase are received by power input coils $14_a$, $14'_a$, rectifying circuit 16 produces a supply voltage on supply bus 17, thereby energizing amplifier 26, validation character register 38 and character generator 42 providing a charging source for cell 33, and providing a conditioning input signal to AND gates 24, 30, 36, and to AND gate 27 via exclusive OR gate 29.

When clock pulse signals are now received by clock input coil $13_a$, the data in data register 25 is serially clocked out, amplified by amplifier 26 enabled by the voltage on supply bus 17, and used to generate data output signals in data output coil $11_a$. The serially clocked output data is also recirculated via AND gate 27, enabled by the supply voltage on supply bus 17 via exclusive OR gate 29, and OR gate 22 to data input 23 of data register 25. Thus, the contents of data register 25 are both manifested at data output coil $11_a$ and restored in data register 25. Energy cell 33 maintains the data in data register 25.

When data input signals are received by data input coil 12, AND gate 20 blocks transmission to data register 25 unless enabled by the output of inverting OR gate 21. Inverting OR gate 21, however, does not produce an enabling output unless a validation signal appears at the output of COMPARE TOKEN circuit 45 and FRAUD counter 55 has not been counted full. Assuming FRAUD counter 55 is not full, new data is not stored in data register 25 unless a validation signal is produced in the following manner.

When the validation character pulses are received byy validation character input coil $15_n$, these pulses are transmitted by AND gate 36 enabled by the voltage on supply bus 17 to data input 37 of validation character register 38. When clock pulses are contemporaneously received by clock input coil $13_a$, and transmitted by enabled AND gate 30 to clock input 39 of validation character register 38, the validation character pulses are serially clocked into validation character register 38. If the validation character clocked into the validation character register 38 agrees with the data token identification character generated by character generator 42, enabled by the supply voltage on supply bus 17, COMPARE TOKEN circuit 45 produces a validation signal which is sustained so long as validation character register 38 is enabled by voltage on supply bus 17. This validation signal is applied to an input of inverting AND gate 24.

With supply voltage and a validation signal present at the enabling inputs of inverting AND gate 24, and FRAUD counter 55 not full, the output of inverting OR gate 21 conditions AND gate 20 to transmit subsequently received data input pulses from data input coil $12_n$ to data input 23 of data register 25. At the same time, the combined inputs to exclusive OR gate 29 from supply bus 17 and COMPARE TOKEN circuit 45 cause exclusive OR gate 29 to disable data recirculation via AND gate 27. Thus, original data in data register 25 is lost during storage of fresh data therein.

It is conceivable that the value of the data token identification character could be empirically determined by injecting a succession of validation characters into validation character register 38 and sensing the state of the data storage circuitry. To guard against such an unauthorized disclosure of the data token identification character, FRAUD counter 55 and the circuitry associated thereto is provided. Whenever an erroneous validation character having the correct bit in the M-1st stage is inserted into validation character register 38, the output of this stage is applied to an input of AND gate 52 after the delay introduuced by delay element 53. Since the validation character is erroneous, the false output of compare token circuit 45 inverted true by inverter 50 and applied to another input of AND gate 52 enables this element to produce an output signal which increments FRAUD counter 55. After X such attempts (X=6 in the preferred embodiment), the last stage of FRAUD counter 55 produces an output control signal which is inverted by inverter 57 and applied to junction 58. In the preferred embodiment, the application of the inverted control signal from FRAUD counter 55 to junction 58 forward biases diode 59, which permanently clamps one input of AND gate 52 to the false level, thereby permanently preventing further incrementing of FRAUD counter 55. Thus, after a few erroneous validation characters have been inserted into validation character register 38, the data token is permanently disabled from accepting any new data. This action renders the token useless, since the step PC600 comparison test made by COMPARE II circuit 78 in the manner noted above will always lead to a faulty transaction indication during step PC700. As will be apparent to those skilled in the art, the number of permitted fraudulent attempts X to insert a validation character may be arbitrarily chosen. The use of a scale of six counter in the preferred embodiment has been found to provide excellent results.

In the preferred embodiment, a first light emitting diode 60 encapsulated in the data token in such a manner as to be visible to the user is coupled between supply bus 17 and junction 58. When FRAUD counter 55 is counted full, diode 60 is energized whenever a supply voltage is present on bus 17. In this manner the user is apprised of the fact that the token is permanently disabled.

In a given application it may be useful to provide the token user with an indication that the value of the data in data register 25 has fallen below one or more predetermined threshold values. In a transportation fare scheme, eg, it is useful to provide a warning to the token user when the fare credit balance has fallen below the minimum fare in order to indicate that the token is not longer valid for even the shortest trip and should be replenished. It is also advantageous to provide another warning to the token user when the fare credit balance has fallen below an arbitrary value, such as the maximum fare (i.e. the fare for the longest trip), to indicate to the prudent user that the token should be replenished in the near future. In other data handling schemes, of course, other considerations apply to establishing the warning thresholds.

Such a warning feature is implemented in data token portion 10 in the following manner. Second and third light emitting diodes 61, 62 are coupled between supply bus 17 and first and second data decoders 63, 64 respectively, each coupled to data register 25, via data buses 65, 66. Light emitting diodes 61, 62 are encapsulated in a manner similar to light emitting diodes 60 in the data token so as to be visible to the token user. Decoders 63, 64 are each coupled to selected stages of data register 25 to produce an output signal serving to energize associated light emitting diodes 61,62 when the value of the data falls below the respective predetermined threshold values. In a transportation fare scheme, eg, decoder 63 produces an enabling output signal for light emitting diode 61 whenever the value of the data in data register 25 falls below the maximum fare. Likewise, decoder 64 produces an enabling output signal for light emitting diode 62 whenever the value of the data falls below the minimum fare.

Decoders 63, 64 may be implemented in any one of a number of known ways to produce the desired enabling signals. As will be appreciated by those skilled in the art, in general once the desired threshold values are chosen, the corresponding binary stages of data register 25 are coupled to gating circuits which are configured to sustain an enabling signal for all data values below the given threshold values. Since such decoding circuitry is well known, further details have been omitted to avoid prolixity.

Data Transfer Portion 70

As noted above, data transfer portion 70 is provided with matched sensing coils $11_b$, $12_b$, $13_b$, $14_b$, $14'_b$, and $15_b$. Data input coil $11_b$ senses data from output coil $11_a$ of data token portion 10. Data output coil $12_b$ generates data signals obtained from the output register of computer 88 for transfer to data register 25 of data token portion 10. Clock coil $13_b$ generates the clock pulse signals for clock pulse coil $13_a$ of data token portion 10. Oppositely wound power coils $14_b$, $14'_b$ generate properly phased and polarized power signals for energizing rectifying circuit 16 of data token portion 10. Validation character coil $15_b$ generates validation character pulse signals for transfer to validation character register 38 of data token portion 10.

Computer 88 may comprise any suitable general purpose digital computer. Encoder 89 is a programming device for specifying the desired data processing scheme which, it has been noted, forms no part of the invention and is accordingly not described in further detail.

Figure 5:
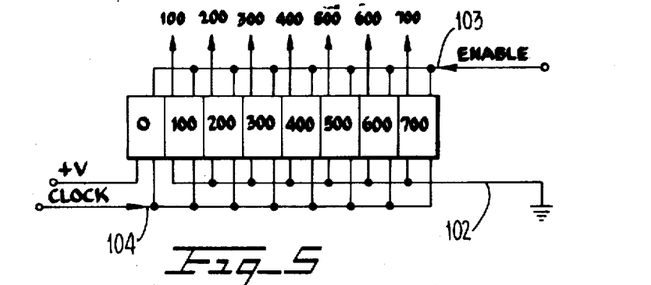
FIG. 5 illustrates the program counter for controlling system operation.

Program counter 85 comprises an eight-stage counter which normally resides in the zero state. The preferred embodiment of program counter 85 is shown in FIG. 5 and comprises an eight-stage shift register connected for both parallel and serial mode data shifting. The parallel data input to stage zero is coupled to a supply of voltage +V while the parallel data inputs of remaining stages of 100-700 are coupled to ground via bus 102. The signal on ENABLE lead 103 normally enables the parallel mode data inputs so that stages 100-700 are normally reset by the voltage on ground bus 102 and stage zero is set by the voltage +V on input bus 101. In this condition, the appearance of clock pulses from low frequency oscillator 86 on clock bus 104 does not alter the state of program counter 85. When the signal on ENABLE lead transitions to the opposite level, the parallel data inputs are disabled and the serial shift mode is enabled. Thereafter, successive clock pulses on clock bus 104 cause suuccessive ones of stages 100-700 to individually be set in serial fashion. As each succeeding stage is set, the preceding stage is reset. The set output of the individual stages 100–700 provide the individual program control steps 100–700. When program counter 85 reaches step PC700, the appearance of PC700 causes circuitry shown in FIG. 2 to restore the signal on ENABLE lead 103 to the original quiscent level, thereby enabling all parallel data inputs and resetting program counter 85 to the zero set stage.

Figure 6:
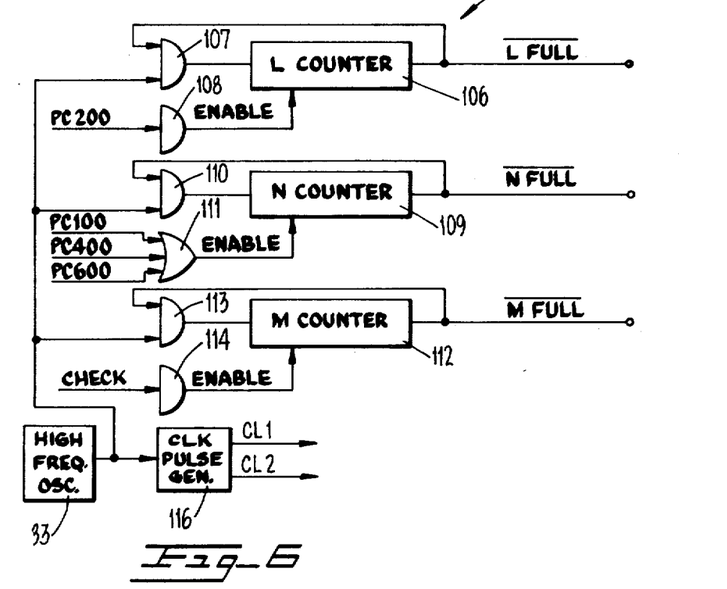
FIG. 6 illustrates a multi-counter control circuit used in the data transfer device.

Multi-counter circuit 82 illustrated in FIG. 6 provides appropriately timed enabling signals for various logic elements of data transfer portion 70. Multi-counter circuit 82 comprises three similar counters 106, 109, 112, each having a clock input gate 107, 110, 113, and an enabling mode control gate 108, 111, 114, respectively. The output of the last stage of each counter is fed back to the respective clock input gate to condition this element so long as the counter is not full. The remaining input to the clock input gate of each counter 106, 109, 112 is obtained from free-running oscillator 83. Each counter 106, 109, 112 is enabled whenever the indicated signals are present at the input to the associated ENABLE input gate.

Figure 8:
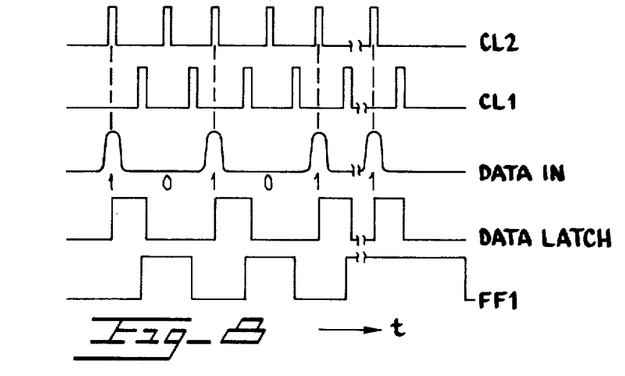
FIG. 8 is a timing diagram illustrating the operation of the FIG. 6 data register during data storage.

The output of oscillator 83 is also coupled to the input of a clock pulse generator 116 which provides a pair of pulse trains labeled CL1, CL2 for purposes described below. As illustrated in FIG. 8 pulse trains CL1, CL2 are separate trains of narrow pulses spaced substantially 180° apart. Several circuits are known for producing such a pair of pulse trains. One such circuit comprises a pair of monostable multipliers having a short time-out period relative to the period of oscillator 83, the input of one monostable multiplier being obtained directly from the output of oscillator 83, the input of the other monostable multiplier comprising the inverted output of oscillator 83. Other equivalent circuits will occur to those skilled in the art.

Counters 106, 109, 112 each comprise any suitable counting device known to those skilled in the art. In the preferred embodiment, each counter is configured similarly to program counter 85, discussed above, with the exception that the parallel data input of the first stage of each counter is coupled to ground, and the parallel data inputs of the remaining stages are all coupled to +V. Thus, in the quiescent state the first stage of each counter is reset and the remaining stages are all set. Also, when a given counter has been clocked to capacity, the last stage is reset. This configuration permits the output of the last stage to be used directly to indicate whether the counter is full in the logic circuitry of FIG. 2. Other equivalent configurations will occur to those skilled in the art.

L Counter 106 provides an enable signal for permitting CL1 clock pulses to be transmitted to computer 88 during step PC200 in the manner to be described.

M Counter 109 provided an enabling signal for permitting CL1 clock pulses to serially shift an M-bit validation character out from validation character register 80 and to generate data token clock pulse signals in clock coil 13$_b$ during step PC300 in the manner described below.

N Counter 109 provides an enabling signal for controlling data shifting and clock signal generation during steps PC100, PC400 and PC600 in the manner described below.

As will now be apparent, the relative frequencies of high frequency oscillator 83 and low frequency oscillator 86 must be selected to permit L, N, and M Counters 106, 109, 112 to be counted full during a given state of program counter 85. This can be achieved by selecting a frequency for oscillator 86 having a period greater than the time required to count the longest of the three counters to the full state. Alternatively, low frequency oscillator 86 may be omitted and the clock signal for program counter 85 derived from high frequency oscillator 83 by appropriate known divider circuitry to provide a clock signal train having a period greater than the full count period of the longest three counters.

Figure 7:
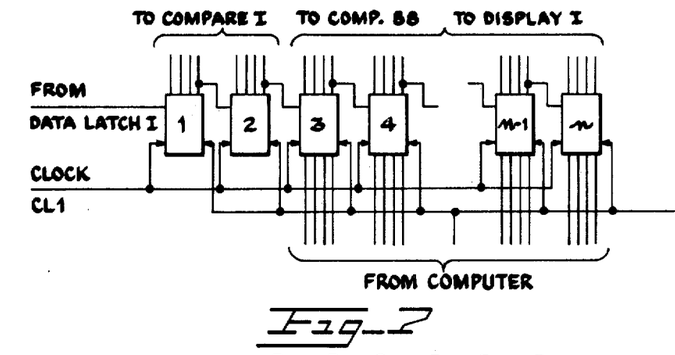
FIG. 7 illustrates a data register used in the data transfer device.

DATA REG I 72 and DATA REG II 74 each comprises a serial-parallel N-bit shift register of the type shown in FIG. 7. A plurality of stages 1–n, (n=N/4) each stage having a four-bit capacity, are serially connected. Each stage has four parallel input leads and four parallel output leads, a MODE control input and a CLOCK input. The MODE control input signal on lead 117 functions in a manner similar to that already described with reference to the ENABLE lead 103 of program counter 85. Similarly, the clock input signals on clock bus 118 function in a manner similar to that already described with reference to the clock signals on clock bus 104 of program counter 85.

Display I-73 and display II-75 each may comprise a direct binary neon display or a multi-digit seven segment decimal display, such as a plurality of Nixie tubes, and associated known control circuitry. As depicted, each display is provided with an ENABLE input and associated circuitry for controlling the operation thereof. The ENABLE signal may be generated by computer 88 or by an appropriate control signal intrinsic to data portion 70 eg. START, PC600, PC700, etc.

With reference to FIG. 2, proper insertion of a data token into the above noted receptacle interrupts the light path between a light source 120 and a photo cell 121, thereby actuating a one-shot circuit 122 which generates a momentary TOKEN signal. The TOKEN signal resets token latch 98 which is preferably a set-reset flip flop, via an OR gate 97. The TOKEN signal also enables an AND gate 123 already conditioned by the reset condition of a START flip flop 125, to set START flip flop 125.

When START flip flop 125 sets, AND gate 123 is disabled thereby preventing removal and insertion of the same or a different token from affecting operation of the system until a system cycle has been completed. When START flip flop 125 sets, the set output thereof enables an exclusive OR gate 126 which in turn enables an AND gate 127 to transmit appropriate pulse signals via a power amplifier 128 to power output coils 14$_b$, 14'$_b$. In the preferred embodiment, the 1 Khz pulse signal input to AND gate 127 is obtained from oscillator 83 of FIG. 6 by means of appropriate divider circuitry. During a system cycle, power pulse signals are generated continuously except during step PC500. When START flip flop 125 sets, the set output thereof enables program counter 85 via ENABLE lead 103 to step off zero, and also enables AND gate 93 to transmit pulses from oscillator 86 along clock bus 104 of program counter 85. So long as $\overline{DEFICIT}$ and $\overline{TOKEN\ LATCH}$ signals are both true.

When program counter 85 steps to PC100, N counter 109 is enabled via OR gate 111 and commences to count. The enabled output of an OR gate 130 applied to an AND gate 132 along with N FULL signal permits AND gate 132 to transmit CL2 pulses via an OR gate 133 to clock output coil 13$_b$. Coil 13$_b$ generates clock signals which clock data out from data token portion 10 in the manner described above. The data serially received by data input coil $11_b$ is transmitted through an AND gate 136 enabled by step PC100 and placed in a DATA LATCH I 137, which is preferably a set-reset flip flop. The successively appearing data bits which are in phase with CL2 clock pulses trigger DATA LATCH I 137. Incoming data is shifted from DATA LATCH I 137 into DATA REG I 72 by the CL1 signals transmitted by an AND gate 135 enabled by step PC100 and $\overline{\text{N FULL}}$ control signals.

With reference to FIG. 8, serial data storage in DATA REG I 72 proceeds as follows. DATA LATCH I 137 is set by the concurrence of a one bit and a CL2 pulse. If no pulse appears, DATA LATCH I 137 remains reset. The contents of DATA LATCH I 137 are shifted into the first stage of DATA REG I 72 by a CL1 clock pulse and the various stages are shifted right by the leading edge of each CL1 pulse. DATA LATCH I 137 is subsequently reset by the trailing edge of each CL1 pulse.

After a predetermined time interval sufficient to enable each bit of the data word in data register 25 of data token portion 10 to be transferred in serial fashion into DATA REG I 72 the time interval being determined by oscillator 86, program counter 85 steps to PC200.

During step PC200, data in DATA REG I 72 is transferred in parallel into computer 88 for processing. AND gate 108 transmits the proper level enabling signal occasioned by the appearance of PC200 at the input thereto to L counter 106 and L counter 106 commences to count. AND gate 139 enabled by PC200 and $\overline{\text{L FULL}}$ transmits CL1 pulses to computer 88. The CL1 pulses provide time reference signals to computer 88 for delimiting the data processing interval of the system cycle. Upon receipt of PROCESS DATA signals from AND gate 139, computer 88 generates a MODE signal of appropriate level to enable parallel data transfer from DATA REG I 72 into the appropriate computer circuitry. Alternatively, the PROCESS DATA output signal from AND gate 139 can be used directly to generate the desired MODE signal in any appropriate manner, eg. by setting a latch which may be reset at the end of step PC200.

The computational result is transferred in parallel from computer 88 to DATA REG I 72. In addition, the result is stored in an appropriate output register of computer 88 for possible future transfer.

As noted above, if the data processing computation results in a deficient balance, computer 88 produces a DEFICIT signal on lead 91. The inverted form of this signal disables AND gate 92, which in turn disables AND gate 93, thereby blocking transmission of further clock pulses from oscillator 86 to program counter 85. Absent the DEFICIT signal, when L counter 106 is full, AND gate 139 is disabled, the MODE signal returns to the original level enabling DATA REG I 72 for serial operation and program counter 85 steps to PC300.

Appearance of PC300 signal conditions AND gate 95, which generates a CHECK signal if the output of COMPARE I 76 indicates that the check portion of the data word in DATA REG I 72 agrees with the check character generated by check character generator 77. Absent a CHECK signal, PC300 at the input of exclusive OR gate 96 sets token latch 98, which disables AND gates 92, 93 and program counter 85 and lights TOKEN DEFECT display lamp 99.

If CHECK signal appears, M counter 112 is enabled by AND gate 114 and commences counting. AND gate 140 is enabled by PC300 and $\overline{\text{M FULL}}$ to transmit CL1 pulses to the clock input of validation character register 80 along clock bus 141. Validation character register 80 comprises an M-bit serial shift register having a recirculation path 142. Thus, during PC300 the predetermined validation character contained in validation character register 80 is clocked out and used to generate validation character pulses in coil $15_b$. These pulses, it will be remembered, are sensed by data token portion 10 and result in the validation character being serially presented to the data input of register 38 housed in the data token.

In order to clock the validation character into register 38, AND gate 131 is enabled by CHECK and $\overline{\text{M FULL}}$ signals to transmit CL1 pulses via OR gate 133 to clock coil $13_b$. The resulting clock signals are sensed by data token portion 10 and presented to the clock input 39 of validation character register 38.

When M counter 112 is clocked full, AND gates 113, 131, and 140 are disabled and program counter 85 counts to step PC400, thereby disabling AND gate 95.

During step PC400, processed data is transferred from computer 88 to data register 25 of data token portion 10. N Counter 109 is enabled by PC400 at the input OR gate 111. PC400 and $\overline{\text{N FULL}}$ enable an AND gate 144 to transmit CL1 pulses to computer 88. The CL1 pulses provide time reference signals for delimiting the data output interval of the system cycle. Computer 88 serially transmits the processed data to data output coil $12_b$ which results in the data being serially presented to the data input 23 of data register 25 of data token portion 10. In order to clock the data into data register 25, CL2 pulses are transmitted by AND gate 132, enabled by PC400 at OR gate 130 and $\overline{\text{N FULL}}$, via OR gate 133 to clock coil $13_b$. The resulting clock signals are sensed by data token portion 10 and presented to clock input 31 of the data register 25. As noted above, the processed data is accordingly clocked into data register 25 unless COMPARE TOKEN circuit 45 fails to produce an enabling signal for AND gate 21 or the data token is permanently disabled.

When N counter 109 is counted full, OR gate 111 is disabled, along with AND gates 132, 144 and program counter 85 counts to step PC500.

During step PC500, data recirculation in data register 25 of data token portion 10 is enabled. This is accomplished by removing one of the two input signals to exclusive OR gate 29, in order to enable AND gate 27. The signal so removed is the output from COMPARE TOKEN circuit 45. The signal is removed by de-energizing rectifying circuit 16 so that the voltage on supply bus 17 is removed, causing validation character register 38 to be de-energized. Rectifying circuit 16 is de-energized by stopping the generation of power signals by power coil $14_b$, $14'b$. This is accomplished by disabling exclusive OR gate 126 with PC500 signal.

During step PC600, data in data register 25 is serially transmitted in DATA REG II 74 and compared with the processed data in DATA REG I 72 to insure that the processed data was correctly transmitted to the data token during step PC400. When program counter 85 steps to PC600, N counter 109 is enabled by the output of OR gate 111. Exclusive OR gate 126 is again enabled by removing PC500 and AND gate 127 transmits 1 Khz pulses to power coils $14_b$, $14'_b$.

The resulting power signals energize rectifying circuit 16 and voltage is again present on supply bus 17. However, since validation character register 38 is a volatile store, the contents of register 38 are no longer the validation character transmitted thereto during step PC300, and thus the output of COMPARE TOKEN circuit 45 remains low. Since exclusive OR gate 29 is now provided with an enabling voltage on one input only, the output thereof enables AND gate 27. It is noted that the low output of COMPARE TOKEN circuit 45 does not cause FRAUD counter 55 to be incremented, since the remaining input signal to AND gate 52 is now at the zero level, validation character register 38 having been cleared to the all zero state during step PC500.

CL2 clock pulses are transmitted by AND gate 132, enabled by PC600 at the input to OR gate 130 and $\overline{N}$ $\overline{FULL}$, via OR gate 133 to clock coil $13_b$. The resulting clock signals are sensed by data token portion 10 and used to clock out the processed data in data register 25. The processed data is recirculated in data register 25 and also transmitted via amplifier 26 to data input coil $11_b$.

The data serially received by data input coil $11_b$ is transmitted through an AND gate 146 enabled by PC600 and placed in a DATA LATCH II 147, similar to DATA LATCH I 137. The successively appearing data bits are clocked from DATA LATCH II 147 into DATA REG II 74 by the CL1 signals transmitted by an AND gate 145 enabled by PC600 and $\overline{N\ FULL}$ control signals. The operation of DATA LATCH II 147 and DATA REG II 74 is substantially identical with that described above with reference to the serial storage of data into DATA LATCH I 137 and DATA REG I 72. After a predetermined time interval sufficient to enable each bit of the word in data register 25 of data token portion 10 to be transferred in serial fashion into DATA REG II 74-the time interval being determined by oscillator 86-program counter 85 steps to PC700.

The appearance of PC700 control signal at the input of release latch 150 causes this element to be set. Release latch 150 may comprise a set-reset flip flop. If the data words now stored in DATA REG I 72 and DATA REG II 74 agree, the output signal from COMPARE II circuit 78 enables an AND gate 151 to generate a control signal which is amplified by a power amplifier 152 and coupled to RELEASE terminal 153. As noted above, this signal can be used to release a cash drawer or unlock a turnstile, etc.

As further noted above, if the data words in DATA-REG I 72 and DATAREG II 74 do not agree, the RELEASE control signal is not generated. This condition may be sensed and used, if desired, to generate a control signal for lighting a display lamp indicating that a transaction is invalid.

The appearance of PC700 at the input to OR gate 124 also resets START FF 125 which in turn disables exclusive OR gate 126 and program counter 85, and conditions AND gate 123 to receive a subsequently generated TOKEN control signal. The system is now ready for the insertion of a data token, unless a token defect or an invalid transaction was indicated previously. If either of these two conditions have occurred, the system can be reset by an appropriate control circuit for generating a RESET signal. Such a control circuit may be either automatic or operator controlled, as desired, and may comprise a time out circuit, a manual switch or the like.

Data handling systems constructed according to the invention enjoy a high degree of security. For example, if an attempt is made to extract the validation character from register 80 by inserting a probe into the data transfer receptacle and initiating operation of the system, such an attempt will fail. The lack of a valid output signal from COMPARE I 76 prevents generation of a CHECK signal by AND gate 95, maintaining M counter 112 disabled. Since M counter 112 is disabled, no clock pulses are transmitted by AND gate 140 to validation character register 80. For added security, validation character register 80 may be placed at a remote location from the remainder of data transfer portion 70, e.g. in a locked compartment.

Similarly, due to the circuit configuration of data token portion 10, the token identification character contained in token identification character generator 42 is inaccessible to an external probe and cannot be extracted by any means. By implementing data token portion 10 with integrated circuitry, any attempt to discover the data token identification character by disassembling and inspection of data token portion 10 will likewise be futile since the circuitry is destroyed by the act of disassembly.

If additional system security is desired, a pair of jamming coils may be located at the entrance to the data transfer receptacle above data input coil $11_b$, and coupled to source of noise signals. With such a provision, any attempt to extract the various signals by means of a sensing probe will be defeated since the noise signals will completely mask the signals generated by the system.

Figure 9:
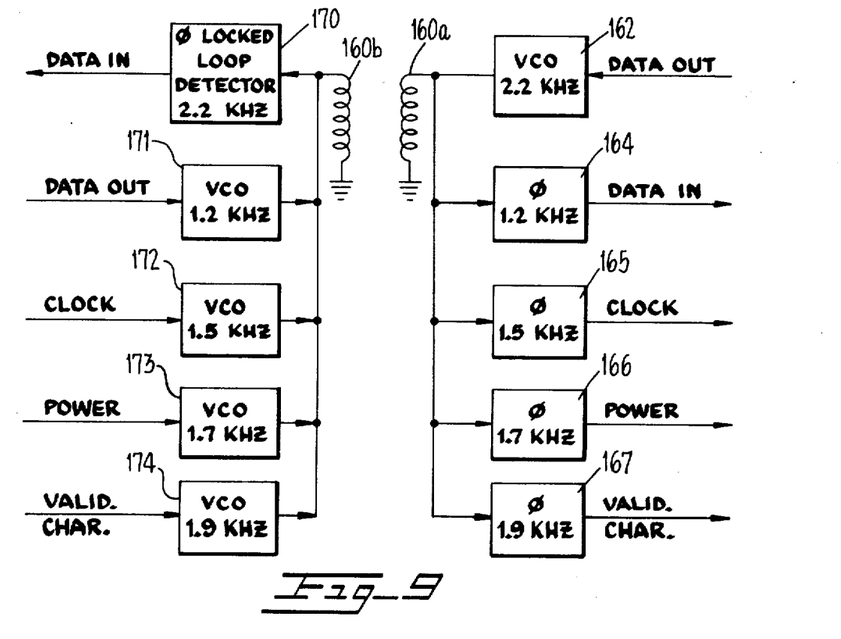
FIG. 9 illustrates an alternate embodiment of the signal coupling means which uses a single pair of sensing coils.

FIG. 9 illustrates an alternate arrangement employing a single pair of coils $160_a$, $160_b$ for transferring signals between data token portion 10 and data transfer portion 70. A voltage controlled oscillator 162 having a frequency of 2.2 Khz and located in the data token receives data output signals from amplifier 26 of data token portion 10. The output from voltage controlled oscillator 162 is coupled to coil $160_a$ located in the data token. Coil $160_a$ is also coupled to the input of each of a plurality of phase locked loop detectors 164–167. Located in the data transfer portion 70 is a phase locked loop detector 170 having a loop frequency of 2.2 Khz, the input to which is coupled to coil $160_b$, and a plurality of voltage controlled oscillators 171–174, the outputs of which are also coupled to coil $160_b$. The oscillator frequencies of voltage controlled oscillators 171–174 are spaced and matched to the loop frequencies of phase locked loop detectors 164–167 as shown. The circuit configuration of voltage controlled oscillators 162, 171–174 and phase locked loop detectors 164–167, 170 are all well known and further details have been omitted to avoid prolixity.

In operation, data output signals from amplifier 26 are converted by voltage controlled oscillator 162 to signals having a frequency of 2.2 Khz which are transferred via coils $160_a$, $160_b$, and detected by phase locked loop detector 170 having a matching loop frequency to provide data input signals to data transfer portion 70. Data output signals from data transfer portion 70 are converted by voltage controlled oscillator 171 to 1.2 Khz signals which are transferred via coils $160_b$, $160_a$ to phase locked loop detector 164 having a matching loop frequency and converted to data input signals to data token portion 10. Similarly, clock signals, power signals and validation character signals are each converted by their respective voltage controlled oscillators 172, 173, 174 to signals having the appropriate frequency, transferred via coils 160$_b$, 160$_a$ to phase locked loop detectors 165, 166, 167 and converted to clock power and validation character signals respectively.

The single coil pair embodiment shown in FIG. 9 may be employed to provide an additional degree of security, since fraudulent extraction of the various signals is impossible unless the various oscillator and loop detector frequencies are known in advance. The single coil pair embodiment of FIG. 9 may be employed with either a data token housed in a member having the shape of a small fountain pen, or with other more convenient shapes, such as a card, a coin, etc.

As will now be apparent, data handling systems constructed according to the invention provide a powerful means for implementing a data transaction system having a high degree of security. The tamper-proof design of data token portion 10 insures that user attempts to alter the data contents or the token identification character in a fraudulent manner will be futile. The arrangement of data transfer portion 70 insures that attempted use of an improper token to conduct a credit transaction will be automatically defeated. In addition, the design of the system prevents unauthorized extraction of the validation character essential to the operation of the system.

As will be further apparent from the foregoing, the visible warning provided by light emitting diodes 60, 61, 62 and the circuitry associated therewithin the data token offers the advantage that the user is apprised immediately upon insertion of the data token into the receptor associated with the data transfer portion that the token is either permanently disabled, in need of replenishing, or close to being in need of replenishing. A separate station may be provided, if desired, for testing the condition of the token data register 25. Such a station need only contain power coils 14$_b$, 14′$_b$ and the circuitry associated therewith (FIG. 2) for providing power signals for matching coils 14$_a$, 14′$_a$ of data token portion 10 (FIG. 1), since light emitting diodes 60–62 and the circuitry associated therewith are actuated when voltage is present on supply bus 17 and the threshold or fraud conditions are met. The provision of such a test station avoids needless congestion at a transit turnstile or a cashier's station due to users with disabled or devalued tokens.

While the above provides a full and complete disclosure of the preferred embodiments of the inventions, various modifications, alternate configurations and equivalents may be employed without departing from the scope and spirit of the invention. For example, in applications requiring a lesser degree of security, circuitry for generating a validation character signal having a different form than the multi-bit binary data word described above may be provided. In such applications, an analogue signal, a signal having a predetermined secret frequency, or the like may be employed for antifraud protection. In addition, other types of indicators than light emitting diodes may be employed if preferred in conjunction with data detectors 63, 64 and the antifraud circuitry. Therefore, the above description and illustrations should not be construed as limiting the scope of the invention which is solely defined by the appended claims.

What is claimed is:

1. In a portable data storage token having an active data register for containing variable data; coupling means including means for reading data from said register, means for manifesting data read from said register externally of said data storage taken, means for sensing data generated by an external data transfer device, and means for sensing externally generated control signals; and control means for enabling transfer of data between said register and said coupling means; the improvement wherein said control means includes means for normally inhibiting data flow between said data register and said external data transfer device and said data storage token further includes testing means coupled to said sensing means and said control means and responsive to the receipt of an externally generated predetermined validation character signal for generating a signal for disabling said inhibiting means to permit data flow between said data register and said external data transfer device.

2. The apparatus of claim 1 wherein said testing means comprises a token identification character generator for generating a first character signal, a validation character signal sensor for temporarily sensing said predetermined validation character signal therein, and means coupled to said token identification character generator and said validation character signal sensor for generating said disabling signal in response to the correspondence of said first and second character signals.

3. The apparatus of claim 2 wherein said validation character signal is an M-bit binary word and said validation character signal sensor includes an M-bit character register, where M is an integer < 1.

4. The apparatus of claim 2 further including means for disabling said portable data token in response to the receipt of an incorrect validation character signal in said validation character signal sensor.

5. The apparatus of claim 4 wherein said disabling means includes a counter for providing a disabling signal when a predetermined count is attained, and means for incrementing said counter when an incorrect validation character signal is received by said validation character register.

6. The apparatus of claim 4 further including indicator means coupled to said disabling means for providing an indication that said data token is disabled.

7. The apparatus of claim 6 wherein said indicator means includes a light emitting diode.

8. The apparatus of claim 1 further including warning means coupled to said data register for providing an indication that the value of said data lies below a predetermined threshold.

9. The apparatus of claim 8 wherein said warning means includes a light emitting diode.

10. A data transfer system for transferring data between a portable data token having a read/write data register for storing variable data and a computer during a transfer cycle, said system comprising:
   an input means for receiving said variable data from said data token, said input means including first comparator means for checking a predetermined characteristic of said data;
   output means for generating data output signals for transfer to said data token;
   clock means for generating clock pulse signals for transfer to said data token;

means for generating a validation character signal for transfer to said data token;

sequencer means for sequentially enabling said input means, said validation character signal generating means and said output means contemporaneously with said clock means during said transfer cycle; and means responsive to a control signal from said first comparator means for disabling the normal operation of said sequencer means when said predetermined characteristic is invalid.

11. The apparatus of claim 10 further including power means for generating power signals for transfer to said data token, and wherein said sequencer means includes means for disabling said power means during a predetermined portion of said transfer cycle.

12. The apparatus of claim 10 wherein said input means includes first and second data registers for receiving data from said token during different portions of said transfer cycle, and further including second comparator means coupled to said registers for generating a control signal when the contents of said registers agree.

13. The apparatus of claim 10 wherein said validation character signal generating means includes a register for containing a predetermined validation character.

14. The apparatus of claim 10 further including single means for coupling more than one of said input means, said output means, said clock means, and said validation character signal generating means to said data token.

15. The apparatus of claim 14 wherein said output means, said clock means, and said validation character signal generating means each includes a voltage controlled oscillator and said input means includes a phase locked loop means, each said voltage controlled oscillator and said phase locked loop means having a different predetermined operating frequency, and wherein said single coupling means includes a reactive member coupled to said voltage controlled oscillators and said phase locked loop.

16. The apparatus of claim 10 wherein said input means includes first and second data registers for receiving data from data token portion during different portions of said transfer cycle, and further including first and second display means for providing a visible display of the contents of said first and second data registers to enable a visual comparative check thereof.

17. A data handling system operable over a transfer cycle comprising a portable data token portion and a data transfer portion, said data token portion comprising an active data register for containing variable data; coupling means including means for reading data from said register, means for manifesting data read from said register externally of said data token, means for sensing data generated by said data transfer portion, and means for sensing control signals generated by said data transfer portion; control means for enabling transfer of data between said register and said coupling means, said control means including means for normally inhibiting data flow between said data register and said data transfer portion; and testing means coupled to said sensing means and said control means and responsive to the receipt of a predetermined validation character signal generated by said data transfer portion for generating a signal for disabling said inhibiting means to permit data flow between said data register and said data transfer portion;

said data transfer portion comprising input means for receiving said data from said data token portion, output means for generating data output signals for transfer to said data token portion, clock means for generating clock pulse signals for transfer to said data token portion, means for generating said predetermined validation character signal for transfer to said data token portion, and sequencer means for sequentially enabling said input means, said validation character signal generating means, and said output means contemporaneously with said clock means during said transfer cycle.

18. The apparatus of claim 17 wherein said testing means comprises a token identification character generator for generating a first character signal, a validation character signal sensor for receiving said predetermined validation character signal from said data transfer portion, and means coupled to said token identification character generator and said validation character signal sensor for generating said disabling signal in response to the correspondence of said first and second character signals.

19. The apparatus of claim 18 wherein said validation character signal is an M-bit binary word and said validation character signal sensor indicates an M-bit character register, where M is an integer $> 1$.

20. The apparatus of claim 18 further including means for disabling said data token portion in response to the receipt of an incorrect validation character signal by said validation character signal sensor.

21. The apparatus of claim 20 wherein said disabling means includes a counter for providing a disabling signal when a predetermined count is attained therein, and means for incrementing said counter when an incorrect validation character signal is received by said validation character signal sensor.

22. The apparatus of claim 17 wherein said data transfer portion further includes power means for generating power signals for transfer to said data token portion, and wherein said sequencer means includes means for disabling said power means during a predetermined portion of said transfer cycle.

23. The apparatus of claim 22 wherein said output means, said clock means, said validation character signal generating means and said power means each include a voltage controlled oscillator and said input means comprises a phase locked loop means, each said voltage controlled oscillator and said phase locked loop means having a different predetermined operating frequency.

24. The apparatus of claim 17 wherein said input means includes first comparator means for checking a predetermined characteristic of said data, and including means responsive to a control signal from said first comparator means for disabling said sequencer means when said predetermined characteristic is invalid.

25. The apparatus of claim 17 wherein said input means includes first and second data registers for receiving data from said data token portion during different portions of said system cycle, and further including second comparator means coupled to said register for generating a control signal when the contents of said registers agree.

26. The apparatus of claim 17 wherein said validation character signal generating means includes a register for containing a predetermined validation character.

27. The apparatus of claim 17 wherein said input means includes first and second data registers for receiving data from data token portion during different portions of said system cycle, and further including first and second display means for providing a visible display of the contents of said first and second data registers to enable a visual comparative check thereof.

28. A data token testing system comprising a portable data storage token having a plurality of circuit elements therein including a read/write data register for storing variable data, means for storing data in said register, means for fetching data from said register, indicator means coupled to said data register for providing an indication that said data lies below a predetermined threshold value, supply means for supplying power to said elements; and a testing station for generating signals for activating said circuit elements when said token is coupled to said station.

29. The apparatus of claim 28 wherein said data token further includes enabling means for enabling said storing means in response to the receipt by said enabling means of a predetermined token validation signal, said enabling means comprising a token identification character generator for generating a first character signal, a validation character sensor having an input adapted to be coupled to an external validation character signal generator for temporarily storing a second character signal therein, and means coupled to said token identification character generator and said validation character sensor for generating an enabling signal in response to the correspondence of said first and second character signals; means for disabling said portable data token in response to the receipt of an incorrect validation character signal by said validation character sensor; and warning means coupled to said disabling means for providing an indication that said data token is disabled.

30. The apparatus of claim 29 wherein said warning means includes a light emitting diode.

31. The apparatus of claim 28 wherein said indicator means includes a light emitting diode.

32. The apparatus of claim 28 wherein said testing station includes first coil means for generating said signals and said token supply means includes second coil means adapted to be coupled to said first coil means when said data token is in proximity to said testing station.

* * * * *